United States Patent [19]

Izumi et al.

[11] Patent Number: 4,833,947
[45] Date of Patent: May 30, 1989

[54] DIAGNOSTIC SYSTEM FOR A KICKDOWN SWITCH IN AN AUTOMOTIVE VEHICLE

[75] Inventors: Fumiaki Izumi; Shinji Sekido, both of Toyota, Japan

[73] Assignee: Toyota Jidosha Kabushiki Kaisha, Aichi, Japan

[21] Appl. No.: 232,467

[22] Filed: Aug. 16, 1988

[30] Foreign Application Priority Data

Aug. 21, 1987 [JP] Japan ................. 62-207882

[51] Int. Cl.⁴ ............................................. B60K 41/04
[52] U.S. Cl. ........................................ 74/877; 74/866; 74/878; 74/865
[58] Field of Search ............... 74/866, 878, 877, 870, 74/865

[56] References Cited

U.S. PATENT DOCUMENTS

| | | | |
|---|---|---|---|
| 3,974,720 | 8/1976 | Iijima | 74/866 |
| 4,073,203 | 2/1978 | Wurst et al. | 74/866 |
| 4,253,348 | 3/1981 | Will et al. | 74/866 |
| 4,501,171 | 2/1985 | Müller et al. | 74/877 X |
| 4,569,253 | 2/1986 | Higashi et al. | 74/866 |

FOREIGN PATENT DOCUMENTS 0083646 8/1981 Japan .................. 74/877

*Primary Examiner*—Dirk Wright
*Assistant Examiner*—William Gehris
*Attorney, Agent, or Firm*—Oliff & Berridge

[57] ABSTRACT

A diagnostic system for watching the sound operation of a kickdown switch in an automotive vehicle equipped with an automatic transmission adapted to be prohibited from operating at the highest speed stage according to the operation of the kickdown switch, the system including a comparator which compares an output signal from a throttle opening sensor corresponding to the depression of the accelerator pedal of the vehicle and an output signal from the kickdown switch, and generates a warning signal when the two output signals are not correlated with one another in a predetermined mutual relation so as to inform the driver of a malfunction of the kickdown switch.

4 Claims, 4 Drawing Sheets

DIAGNOSTIC SYSTEM FOR A KICKDOWN SWITCH IN AN AUTOMOTIVE VEHICLE

BACKGROUND OF THE INVENTION

1. Field of the Invention

The present invention relates generally to an automatic transmission for an automotive vehicle, and, more particularly, to a diagnostic system for watching on the sound operation of a kickdown switch provided in the automotive vehicle for controlling an automatic transmission incorporated therein so as to prohibit the transmission from operating at at least the highest speed stage when it detects a full depression of the accelerator pedal.

2. Description of the Prior Art.

In the automotive vehicle equipped with an automatic transmission it is well known to incorporate a kickdown system in the transmission so that the transmission is prohibited from operating at at least the highest speed stage when the accelerator pedal is deeply depressed by the driver so that the transmission is shifted down from the highest speed stage to the next or further lower speed stage when it is operating at the highest speed stage or to prohibit the transmission from shifting up to the highest speed stage as long as the accelerator pedal is fully depressed by the driver for generating more power in the engine. In the conventional oil hydraulic control system in the automatic transmission the kickdown system generally comprises an oil hydraulic circuit which is activated by a full depression of the accelerator pedal to supply a line pressure in the system to a control port of an oil hydraulic change over valve which establishes the highest speed stage. In such a conventional mechanical and oil hydraulic kickdown system it is generally improbable that the system gets out of order throughout the normal life of operation of the vehicle.

However, in the modern automotive vehicle equipped with an electrically controlled automatic transmission, the kickdown system includes a kickdown switch of the type of an electrical limit switch which detects a full depression of the accelerator pedal by the driver and provides the electronic computer with information regarding the full depression of the accelerator pedal. However, such limit switch type electric switches available at present are generally more delicate and vulnerable to malfunction as compared with the strong and durable mechanical and hydraulic control system.

In fact, we have come to notice that the electric kickdown switches forming a part of the electrically controlled automatic transmissions in the modern automotive vehicles sometimes get out of order so as not to close when they are to close by a full depression of the accelerator pedal or to remain as closed regardless of the depression of the accelerator pedal. If the kickdown switch has broken so as constantly to indicate the full depression of the accelerator pedal the transmission will remain as being prohibited from shifting up to the highest speed stage. Such a malfunction will generally be noticed by every driver. On the other hand, however, if the kickdown switch has broken not to detect any full depression of the accelerator pedal so as thereby to nullify the kickdown performance of the automatic transmission, the defect is often overlooked without being noticed, particularly when the driver is not skilled in the driving or not much sensitive to the driving performance of the vehicle. This happens more often when the transmission provides an overdrive stage as its highest speed stage.

SUMMARY OF THE INVENTION

The object of the present invention is to provide a diagnostic system for a kickdown switch in such an electrically controlled automotive transmission in the modern automotive vehicle so that a failure in the kickdown switch is immediately noticed and repaired so as infallibly to ensure the high quality driving performance which the automotive vehicle equipped with such a high tech automatic transmission should deserve to.

According to the present invention the above-mentioned object is accomplished by a diagnostic system for a kickdown switch in an automotive vehicle which comprises an engine, an automatic transmission, an accelerator pedal, and a throttle opening sensor for detecting the degree of depression applied to the accelerator pedal, said automatic transmission being adapted to be prohibited from operating at at least a highest speed stage thereof when said kickdown switch detects a full depression of the accelerator pedal, said system comprising a comparator which compares an output signal of said throttle opening sensor and an output signal of said kickdown switch and generates an output signal for warning when the output signal of said throttle opening sensor and the output signal of said kickdown switch are not correlated with one another in a predetermined mutual relation, and a warning indicator which produces a warning signal for a driver of the vehicle according to said output signal for warning of said comparator.

In such a diagnostic system, said comparator may generate said output signal for warning when the output signal of said throttle opening sensor indicates a full depression of the accelerator pedal while the output signal of said kickdown switch does not indicate a full depression of the accelerator pedal.

In such a diagnostic system, said comparator may generate said output signal for warning when the output signal of said throttle opening sensor indicates non depression of the accelerator pedal while the output signal of said kickdown switch indicates a full depression of the accelerator pedal.

BRIEF DESCRIPTION OF THE DRAWINGS

In the accompanying drawings.

DESCRIPTION OF THE PREFERRED EMBODIMENT

The present invention will now be described in detail with reference to the attached drawings, and in terms of a preferred embodiment thereof.

Figure 1:
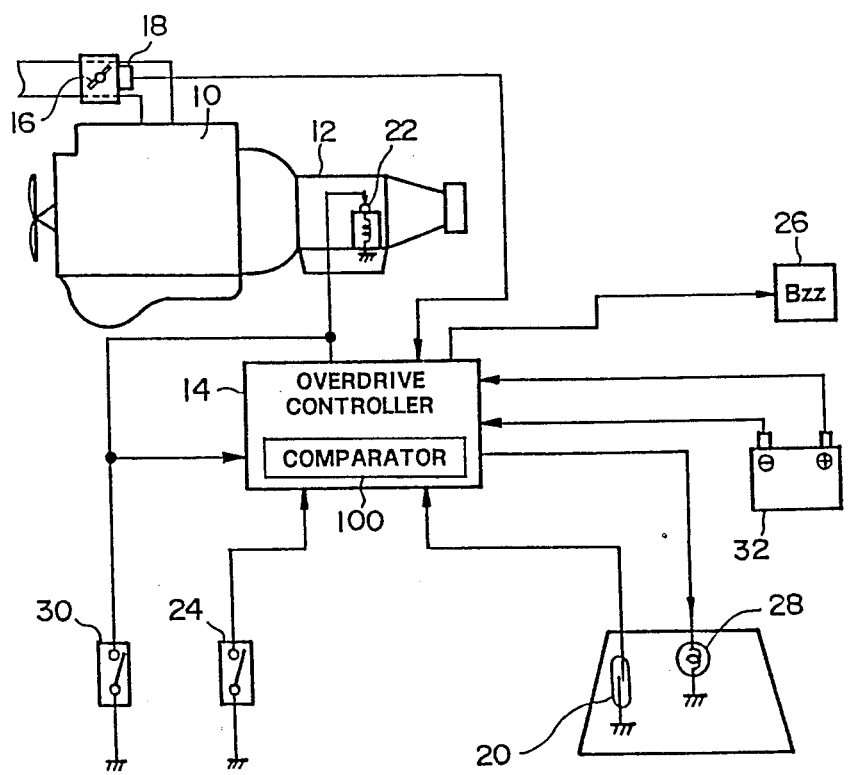
FIG. 1 is a diagrammatical view of a driving system of an automotive vehicle including an engine, an automatic transmission to provide an overdrive stage as the highest speed stage, and a control system for controlling the operation of the automatic transmission, in which the diagnostic system for a kickdown switch according to the present invention is incorporated.

Referring first to FIG. 1, the driving system of an automotive vehicle herein shown includes an engine 10, an automatic transmission 12 adapted to provide an overdrive stage as the highest speed stage when a solenoid 22 incorporated therein is energized, and a control system for controlling the operation of the automatic transmission 12, in which are included an overdrive controller 14 forming a part of a computer control system not shown in the figure for controlling the overall operation of the vehicle, a throttle opening sensor 18 for detecting the degree of the opening of a throttle valve 16 provided in the intake passage of the engine, a vehicle speed sensor 20, a kickdown switch 24 adapted to be closed when the accelerator pedal 1 (FIG. 2) in the vehicle is depressed to a predetermined full depression position, a buzzer 26 and a lamp 28 both for warning the driver of a malfunction of the kickdown switch 24, an overdrive cutoff switch 30 adapted to be operated by the driver for prohibiting the transmission from being shifted to the overdrive stage according to the driver's will, and a battery 32 as an electric power source.

As is already known in the art of computer controlled automatic transmission for an automotive vehicle, the overdrive controller 14 controls the solenoid 22 generally based upon a throttle opening signal received from the throttle opening sensor 18 and a vehicle speed signal received from the vehicle speed sensor 20 so as to put on the solenoid 22 for shifting up the transmission 12 to the overdrive stage when the balance between the throttle opening and the vehicle speed has traversed a predetermined upshift line in a coordinate diagram of the throttle opening and the vehicle speed and to put off the solenoid 22 for shifting down the transmission 12 from the overdrive stage to the next or further lower speed stage when the balance between the throttle opening and the vehicle speed has traversed a predetermined downshift line in the same coordinate diagram. Further, as is already known in this art, the overdrive controller 14 is overridden by the kickdown switch 24 and/or the overdrive cutoff switch 30 so that when the kickdown switch 24 is closed by a full depression of the accelerator pedal or the overdrive cutoff switch 30 is opened by the driver, the overdrive controller 14 does not energize the solenoid 22 regardless of the balance between the throttle opening and the vehicle speed.

Figure 2:
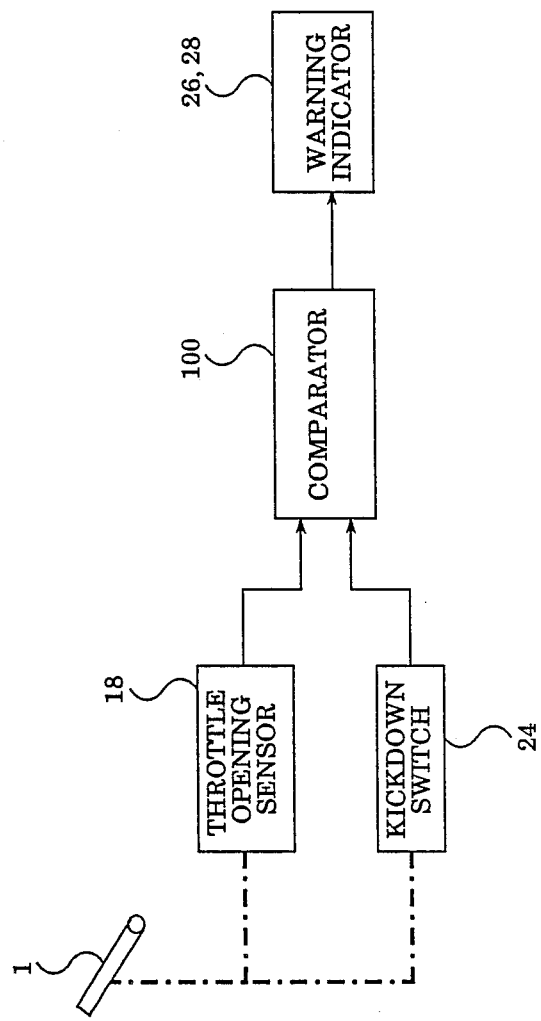
FIG. 2 is a diagrammatical view showing the general construction of the diagnostic system for a kickdown switch according the present invention.

As diagrammatically shown in FIG. 2, the diagnostic system for a kickdown switch according to the present invention comprises a comparator 100 which compares a throttle opening signal generated by the throttle opening sensor 18 according to the depression of the accelerator pedal 1 and a kickdown signal generated by the kickdown switch 24 according to the depression of the accelerator pedal 1 and generates an output signal for actuating a warning indicator such as the buzzer 26 and/or the lamp 28 when the output signal of the throttle opening sensor 18 and the output signal of the kickdown switch 24 are not correlated with one another in a predetermined manner.

Figure 3:
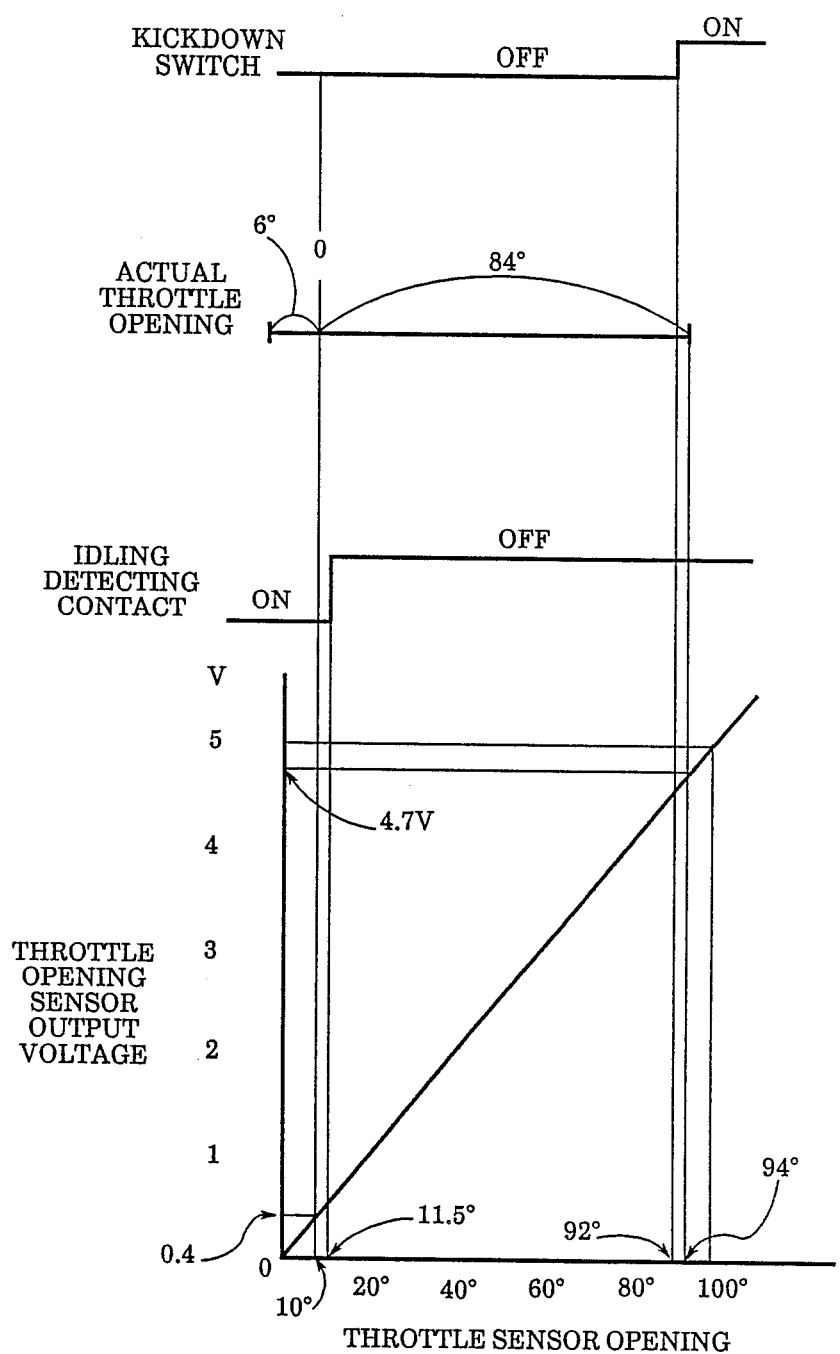
FIG. 3 is a diagram showing the relative operational conditions of the kickdown switch, the throttle opening sensor and the idling detecting contact.

FIG. 3 shows an embodiment of the correlation of the output signals of the throttle opening sensor 18, the kickdown switch 24 and the idling detecting contact 34 (FIG. 4) relative to the opening angle of the throttle valve and the throttle opening sensor.

Figure 4:
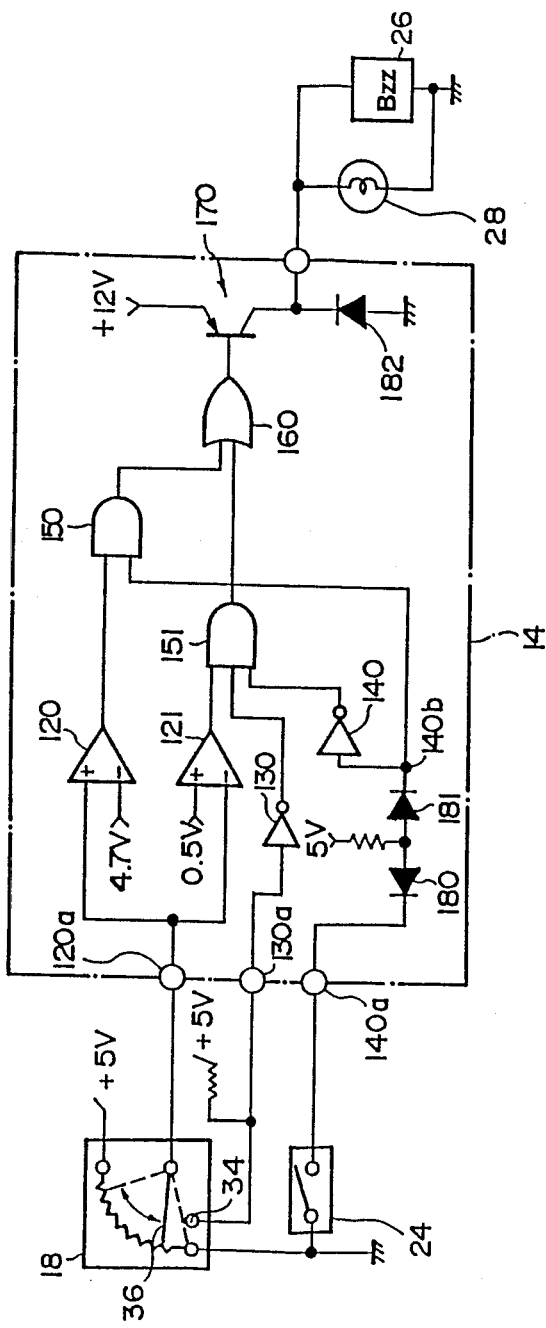
FIG. 4 is a diagram showing an embodiment of the electrical circuit to provide the diagnostic system for a kickdown switch according to the present invention.

FIG. 4 shows an electrical circuit which provides the diagnostic system for a kickdown switch diagrammatically shown in FIG. 2. The electrical circuit shown in FIG. 4 is designed to operate according to the correlation of the throttle opening sensor, the kickdown switch and the idling detecting contact as shown in FIG. 3.

In the embodiment shown in FIG. 3, the throttle valve is rotatable within 90°. However, 6° is taken for the initial opening to ensure the idling operation of the engine. Therefore, when the accelerator pedal is depressed from its fully released position toward its fully depressed position the throttle valve turns within 84°. According to this turning of the throttle valve the throttle opening sensor 18 is adapted to turn from 10° to 94°. The throttle opening sensor 18 is designed to provide an output voltage of 0.4 V at its 10° position and an otput voltage of 4.7 V at its 94° position. The kickdown switch 24 remains in the open condition (OFF) until the accelerator pedal is depressed to a position corresponding to 92° position of the throttle opening sensor 18 and is then closed (ON) when the accelerator pedal is further depressed. The idling detecting contact 34 remains in contact (ON) with a movable contact 36 of the throttle opening sensor 18 thereby being earthed and is separated (OFF) from the moving contact 36 when the moving contact 36 is turned beyond a position corresponding to 11.5° of the throttle opening sensor 18 so as then to have a potential.

In the circuit shown in FIG. 4, the throttle opening sensor 18 is a variable resistance having a movable contact element 36 and a limit contact 34 which operates as the idling detecting contact which contacts with the movable contact element 36 when the latter is in the vicinity of the minimum opening range of the throttle opening sensor; 120 designates a comparator which provides an output "1" when an input higher than 4.7 V is supplied to its positive input terminal while otherwise providing an output "0"; 121 designates a comparator which provides an output "1" when an input lower than 0.5 V is supplied to its negative input terminal while otherwise providing an output "0"; 130 and 140 designate inverters; 150 and 151 designate AND circuits each of which provides an output "1" when all inputs thereto are "1" while otherwise providing an output "0"; 160 designates an OR circuit which provides an output "1" when at least one of its inputs is "1"; 170 designates a transistor; and 180, 181 and 182 designate diodes. The circuit of the idling detecting contact 34 and the inverter 130 may be omitted when the circuit of the comparator 121 is provided. Or, alternatively, the circuit of the comparator 121 may be omitted when the circuit of the idling detecting contact 34 and the inverter 130 is provided.

The circuit shown in FIG. 4 operates as follows:

When the accelerator is operated not to exceed a medium depression, the kickdown switch 24 is opened, if it is normally operating. Therefore, the connecting point 140a is in the "1" state, and therefore the connecting point 140b is also in the "1" state which is transmitted to one input of the AND circuit 150, while the output of the inverter 140 is in the "0" state which is transmitted to one input of the AND circuit 151. Therefore the output of the AND circuit 151 remains in the "0" state regardless of the type of the other input thereto. The output from the throttle opening sensor 18 supplied to the connecting point 120a remains to be lower than 4.7 V, and therefore the output of the comparator 120 remains in the "0" state. Therefore the output of the AND circuit 150 remains to be "0". Therefore the output of the OR circuit 160 remains in the "0" state, and therefore the transistor 170 remains in the open state, and therefore the buzzer 26 and the lamp 24 remain as not energized.

When the accelerator pedal is fully depressed, the kickdown switch 24 is first closed at the 92° position of the throttle sensor opening, and thereafter the output from the throttle opening sensor 18 exceeds 4.7 V. When the kickdown switch 24 is closed, the connecting point 140a becomes in the "0" state, and therefore the connecting point 140b also becomes in the "0" state, while the output of the inverter 140 becomes in the "1" state. Therefore, when the output of the throttle opening sensor 18 exceeds 4.7 V thereby to change the output of the comparator 120 to the "1" state, the output of the AND circuit 150 still remains in the "0" state. When the accelerator pedal is depressed more than a small depression, the output of the comparator 121 becomes in the "0" state. Similarly, when the accelerator pedal is depressed more than a small depression, the idling detecting contact 34 is disconnected from the moving contact 35, and therefore the connecting point 130a becomes in the "1" state, and therefore the output of the inverter 130 becomes in the "0" state. Therefore, in any event, the output of the AND circuit 151 remains in the "0" state. Therefore the output of the OR circuit 160 remains in the "0" state, and the transistor 170 remains in the OFF state.

If the kickdown switch 24 has got out of order so as not to be closed even when the accelerator pedal was fully depressed, the connecting point 140a remains in the "1" state, and therefore the connecting point 140b also remains in the "1" state, and therefore, when the accelerator pedal was fully depressed so that the output of the throttle opening sensor 18 exceeds 4.7 V and thereby the output of the comparator 120 changes to the "1", the output of the AND circuit 150 changes to the "1" state, and therefore the transistor 170 is put on, and the buzzer 26 and the lamp 28 are energized.

If the kickdown switch 24 has got out of order so as to remain in the closed state even when the accelerator pedal is released, the connecting point 140a remains in the "0" state, and therefore the output of the inverter 140 becomes in the "1" state. When the accelerator pedal is released, the output of the throttle opening sensor 18 is 0.4 V, and therefore the output of the comparator 121 becomes the "1" state. When the accelerator pedal is released, the idling detecting contact 34 is in contact with the movable contact element 36, and therefore the connecting point 130a is in the "0" state, and therefore the output of the inverter 130 is in the "1" state. Therefore, in any event the output of the AND circuit 151 becomes "1", and therefore the output of the OR circuit 160 becomes "1", and therefore the transistor 170 is put on, and the buzzer 26 and the lamp 28 are put on.

Thus, by the circuit shown in FIG. 4 the severing breakage of the kickdown switch as well as the stick connecting breakage of the kickdown switch are both detected and warned of to the driver.

Although the present invention has been described and illustrated with respect of several embodiments thereof, it will be clear to those skilled in the relevant art that various modifications are possible with respect to the shown embodiments within the scope of the present invention.

We claim:

1. A diagnostic system for a kickdown switch in an automotive vehicle which comprises an engine, an automatic transmission, an accelerator pedal, and a throttle opening sensor for detecting the degree of depression applied to the accelerator pedal, said automatic transmission being adapted to be prohibited from operating at at least a highest speed stage thereof when said kickdown switch detects a full depression of the accelerator pedal, said system comprising a comparator which compares an output signal of said throttle opening sensor and an output signal of said kickdown switch and generates an output signal for warning when the output signal of said throttle opening sensor and the output signal of said kickdown switch are not correlated with one another in a predetermined mutual relation, and a warning indicator which produces a warning signal for a driver of the vehicle according to said output signal for warning of said comparator.

2. A diagnostic system according to claim 1, wherein said comparator generates said output signal for warning when the output signal of said throttle opening sensor indicates a full depression of the accelerator pedal while the output signal of said kickdown switch does not indicate a full depression of the accelerator pedal.

3. A diagnostic system according to claim 1, wherein said comparator generates said output signal for warning when the output signal of said throttle opening sensor indicates non depression of the accelerator pedal while the output signal of said kickdown switch indicates a full depression of the accelerator pedal.

4. A diagnostic system according to claim 1, wherein said comparator generates said output signal for warning when the output signal of said throttle opening sensor indicates a full depression of the accelerator pedal while the output signal of said kickdown switch does not indicate a full depression of the accelerator pedal, and also when the output signal of said throttle opening sensor indicates non depression of the accelerator pedal while the output signal of said kickdown switch indicates a full depression of the accelerator pedal.

* * * * *